US012262168B2

(12) United States Patent
Munro et al.

(10) Patent No.: US 12,262,168 B2
(45) **Date of Patent: *Mar. 25, 2025**

(54) ACTIVE NOISE REDUCTION EARBUD

(71) Applicant: Bose Corporation, Framingham, MA (US)

(72) Inventors: Andrew Donald Munro, Northborough, MA (US); Lei Cheng, Wellesley, MA (US); Ole Nielsen, Cambridge (GB); Emery Ku, Sudbury, MA (US); Cedrik Bacon, Ashland, MA (US)

(73) Assignee: Bose Corporation, Framingham, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/386,125

(22) Filed: Nov. 1, 2023

(65) Prior Publication Data

US 2024/0064454 A1 Feb. 22, 2024

Related U.S. Application Data

(63) Continuation of application No. 18/073,699, filed on Dec. 2, 2022, now Pat. No. 11,838,719, which is a continuation of application No. 17/362,625, filed on Jun. 29, 2021, now Pat. No. 11,540,043.

(51) Int. Cl.
*G10K 11/178* (2006.01)
*H04R 1/10* (2006.01)

(52) U.S. Cl.
CPC ..... *H04R 1/1083* (2013.01); *G10K 11/17857* (2018.01); *G10K 11/17873* (2018.01); *G10K 11/17881* (2018.01); *H04R 1/1016* (2013.01); *G10K 2210/1081* (2013.01)

(58) Field of Classification Search
CPC ..... G10K 11/17857; G10K 2210/1081; H04R 1/1083; H04R 2460/01
See application file for complete search history.

(56) References Cited

U.S. PATENT DOCUMENTS

| | | | | |
|---|---|---|---|---|
| 11,540,043 | B1 * | 12/2022 | Munro | H04R 1/1016 |
| 11,838,719 | B2 * | 12/2023 | Munro | G10K 11/17881 |
| 2018/0227660 | A1 * | 8/2018 | Azmi | H04R 1/1091 |
| 2022/0095033 | A1 * | 3/2022 | Shinmen | H04R 1/1016 |
| 2022/0254329 | A1 * | 8/2022 | Hayashi | H04R 1/326 |

* cited by examiner

*Primary Examiner* — Ping Lee

(57) ABSTRACT

An active noise reduction earbud includes a housing and a first feedforward microphone disposed in the housing. A first sound inlet opening extends through the housing and is configured to conduct external sound to the first feedforward microphone. The first sound inlet opening is configured to sit within a concha cavum of a user's ear and faces toward an auricle of the user's ear when the earbud is worn.

18 Claims, 5 Drawing Sheets

ACTIVE NOISE REDUCTION EARBUD

CROSS-REFERENCE TO RELATED APPLICATIONS

This application is a continuation of U.S. patent application Ser. No. 18/073,699, filed Dec. 2, 2022, which is a continuation of U.S. patent application Ser. No. 17/362,625, filed on Jun. 29, 2021, now U.S. Pat. No. 11,540,043, the complete disclosures of which are hereby incorporated by reference in their entirety.

BACKGROUND

This disclosure relates to an active noise reduction (ANR) audio device that is carried on or in the user's ear.

ANR audio devices that are carried on or in the user's ear include earbuds and headphones in which the sound outlet is configured to be located in or very close to the external auditory meatus (i.e., external ear canal) of the user. ANR typically involves using one or more feedforward microphones to detect external sound and using a feedback microphone that detects internal sound. The audio driver is driven so as to reduce or cancel the sensed external sounds before they reach the user's eardrum.

SUMMARY

Aspects and examples are directed to an earbud in which its coherence is improved by placing a feed-forward microphone such that it senses noise at or very close to the ear tip. At higher frequencies, the dominant noise path to the user's eardrum is typically through the ear tip and body tissue. A feed-forward microphone close to the ear tip, which is also naturally close to the tissue near the ear canal, will be positioned to sense noise in this dominant noise path that leads to high coherence. This sensed noise is then able to be canceled by the ANR system.

All examples and features mentioned below can be combined in any technically possible way.

In one aspect, an active noise reduction (ANR) earbud includes a housing comprising an outlet portion that defines a sound outlet, wherein the outlet portion is configured to be located in or proximate the external auditory meatus of a user's ear. There is a first feedforward microphone configured to develop a first input signal, and a first sound inlet opening in the housing and configured to conduct external sound to be sensed by the first feedforward microphone. The first sound inlet opening is proximate the outlet portion.

Some examples include one of the above and/or below features, or any combination thereof. In an example when the outlet portion is located in or proximate the external auditory meatus of the user's ear the first sound inlet opening is in the concha of the user's ear. In an example when the outlet portion is located in or proximate the external auditory meatus of the user's ear the first sound inlet opening directly faces the auricle of the user's ear.

Some examples include one of the above and/or below features, or any combination thereof. In some examples the ANR earbud further includes a second feedforward microphone configured to develop a second input signal, and a second sound inlet opening in the housing and configured to conduct external sound to be sensed by the second feedforward microphone. In an example the ANR earbud further includes a first acoustic port in the housing that is in fluid communication with the external auditory meatus, wherein at least one of the first sound inlet opening and the second sound inlet opening is proximate the first acoustic port. In an example the ANR earbud further includes a second acoustic port in the housing that is in fluid communication with the external auditory meatus, wherein the first sound inlet opening is proximate the first acoustic port and the second sound inlet opening is proximate the second acoustic port. In an example a coherence of the ANR earbud in a frequency range, and determined from only the first input signal, is greater than the coherence in the frequency range determined from only the second input signal. In an example the frequency range is above 3 kHz.

Some examples include one of the above and/or below features, or any combination thereof. In some examples the outlet portion comprises a compliant ear tip that defines the sound outlet. In an example the first sound inlet opening is adjacent to the ear tip. In an example when the ear tip is located in or proximate the external auditory meatus of the user's ear the first sound inlet opening is in the concha of the user's ear.

In another aspect a method includes receiving a first input signal developed by a first feedforward microphone associated with an active noise reduction (ANR) earbud with a housing comprising an outlet portion that defines a sound outlet, wherein the outlet portion is configured to be located in or proximate the external auditory meatus of a user's ear. The first feedforward microphone is configured to sense external sound that is conducted through a first sound inlet opening in the housing that is proximate the outlet portion. The first input signal is processed using a first filter, to generate a first output signal for an acoustic transducer of the ANR earbud.

Some examples include one of the above and/or below features, or any combination thereof. In an example when the outlet portion is located in or proximate the external auditory meatus of the user's ear the first sound inlet opening is in the concha of the user's ear. In an example when the outlet portion is located in or proximate the external auditory meatus of the user's ear the first sound inlet opening directly faces the auricle of the user's ear.

Some examples include one of the above and/or below features, or any combination thereof. In some examples the ANR earbud further comprises a second feedforward microphone configured to develop a second input signal, and a second sound inlet opening in the housing and configured to conduct external sound to be sensed by the second feedforward microphone. In an example the ANR earbud further comprises a first acoustic port in the housing that is in fluid communication with the external auditory meatus, wherein at least one of the first sound inlet opening and the second sound inlet opening is proximate the first acoustic port. In an example the ANR earbud further comprises a second acoustic port in the housing that is in fluid communication with the external auditory meatus, wherein the first sound inlet opening is proximate the first acoustic port and the second sound inlet opening is proximate the second acoustic port. In an example a coherence of the ANR earbud in a frequency range, and determined from only the first input signal, is greater than the coherence in the frequency range determined from only the second input signal. In an example the frequency range is above 3 kHz.

Some examples include one of the above and/or below features, or any combination thereof. In some examples the outlet portion comprises a compliant ear tip that defines the sound outlet. In an example the first sound inlet opening is adjacent to the ear tip. In an example when the ear tip is located in or proximate the external auditory meatus of the user's ear the first sound inlet opening is in the concha of the user's ear.

BRIEF DESCRIPTION OF THE DRAWINGS

Various aspects of at least one example are discussed below with reference to the accompanying figures, which are not intended to be drawn to scale. The figures are included to provide illustration and a further understanding of the various aspects and examples, and are incorporated in and constitute a part of this specification, but are not intended as a definition of the limits of the inventions. In the figures, identical or nearly identical components illustrated in various figures may be represented by a like reference character or numeral. For purposes of clarity, not every component may be labeled in every figure. In the figures.

DETAILED DESCRIPTION

Figure 1A:
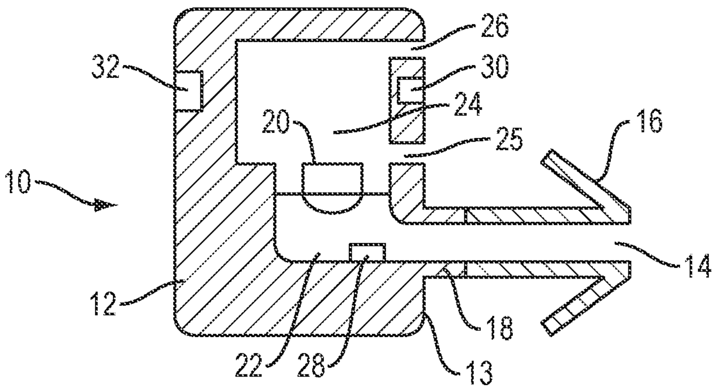
FIG. 1A is a schematic cross-sectional view of an in-ear earbud.

This disclosure relates to a wearable audio device. Some non-limiting examples of this disclosure describe a type of wearable audio device that is known as an in-ear headphone or earbud. Earbuds generally include an electro-acoustic transducer or audio driver that produces sound, and are configured to deliver the sound directly into or very close to the user's ear canal. Earbuds can be wireless or wired. In non-limiting examples described herein the earbuds include one or more feedforward microphones that sense external sounds outside of the housing. Feedforward microphones can be used for functions such as active noise reduction (ANR) and transparency mode operation where external sounds are reproduced for the user by the electro-acoustic transducer. Other aspects of earbuds that are not involved in this disclosure are not shown or described. ANR earbuds and headphones typically also use an internal feedback microphone, as is known in the technical field.

Some examples of this disclosure also describe a type of wearable audio device that is known as an open audio device. Open audio devices have one or more electro-acoustic transducers (i.e., audio drivers) that are located off of the ear canal opening. The open audio devices also include one or more external microphones that can be used to pick up the user's voice and/or for ANR and/or for transparency mode operation.

A headphone refers to a device that typically fits around, on, or in an ear and that radiates acoustic energy directly or indirectly into the ear canal. Headphones are sometimes referred to as earphones, earpieces, headsets, earbuds, or sport headphones, and can be wired or wireless. A headphone includes a driver to transduce electrical audio signals to acoustic energy. The driver may or may not be housed in an earcup or in a housing that is configured to be located on the head or on the ear, or to be inserted directly into the user's ear canal. A headphone may be a single stand-alone unit or one of a pair of headphones (each including at least one acoustic driver), one for each ear. A headphone may be connected mechanically to another headphone, for example by a headband and/or by leads that conduct audio signals to an acoustic driver in the headphone. A headphone may include components for wirelessly receiving audio signals. A headphone may include components of an ANR system, which may include an internal microphone within the headphone housing and one or more external microphones that pick up sound outside the housing. Headphones may also include other functionality, such as additional microphones for an ANR system, or one or more microphones that are used to pick up the user's voice.

An open audio device includes but is not limited to an off-ear headphone, i.e., a device that has one or more electro-acoustic transducers that are coupled to the head or ear (typically by a support structure) but do not occlude the ear canal opening. In some examples an open audio device is an off-ear headphone that is configured to deliver sound to one or both ears of the wearer where there are typically no ear cups and no ear buds. The wearable audio systems contemplated herein may include a variety of devices that include an over-the-ear hook or anchor, one non-limiting example of which includes audio eyeglasses.

One or more of the devices, systems, and methods described herein, in various examples and combinations, may be used in a wide variety of wearable audio devices or systems, including wearable audio devices in various form factors. Such form factors include but are not limited to in-ear devices, earbuds, and hearing aids. Unless specified otherwise, a wearable audio device or system includes headphones and various other types of wearable audio devices such as head or ear-worn acoustic devices that include one more acoustic transducers to receive and/or produce sound and have a sound outlet that is in or close to the ear canal.

It should be noted that although specific implementations of wearable audio devices primarily serving the purpose of acoustically outputting audio are presented with some degree of detail, such presentations of specific implementations are intended to facilitate understanding through provisions of examples and should not be taken as limiting either the scope of the disclosure or the scope of the claim coverage.

In some examples the wearable audio device includes an electro-acoustic transducer that is configured to develop sound for a user, a housing that holds the transducer and has a sound outlet, and at least one feedforward microphone that is configured to detect sound outside of the housing and output a microphone signal. The processor system is programmed to accomplish ANR using the external feedforward microphone(s) and an internal feedback microphone, as is known in the field. A sound inlet opening that leads to a feedforward microphone is located close to the device's sound outlet and thus close to the ear canal, such that the feed-forward microphone senses external noise that reaches the ear canal through the earbud's ear tip and body tissue. The ANR system is thus able to reduce or cancel this external noise.

In an ANR earbud, the effectiveness of the ANR using feedforward microphones can be estimated by the coherence. The coherence is the fraction of the power of the output signal at any given frequency that can theoretically be canceled by a linear control system using an input from a feedforward microphone. Thus, coherence is a value between zero and one. The greater the coherence, the more effective is the potential for noise cancellation. The coherence limit is 1 minus coherence and is therefore the fraction left over after performing cancellation.

In earbuds, noise can reach the user's ear through various paths, including through acoustic ports, through the ear tip, and through body tissue. If diffuse noise is not sensed by a microphone, it cannot be actively canceled by the ANR system. Accordingly, ANR is more effective (i.e., coherence is greater) if there is a feedforward microphone at or close to any location of the earbud that is a path of diffuse noise, or is adjacent to such a noise path. In some examples, ANR effectiveness is increased by the use of multiple feedforward microphones in the concha. In some examples such feedback insertion gain can be combined with passive insertion loss.

Wireless earbuds typically include a housing that accommodates the electronics, the antenna, the battery, and the battery charging contacts, in addition to the audio driver. The necessary size of the housing can require at least part of the housing to be located farther from the ear canal, for example outside of the ear concha and even outside of the external ear (also known as the auricle or pinna). Feedforward microphones located in the housing are thus of necessity spaced from the ear canal, and so are ineffective in sensing noise that enters through the ear tip and the body tissue. ANR coherence in these earbuds is thus lower than may be desirable. Also, external microphones can be used to preview noise, and to overcome delay from the driver to ear acoustic path as well as delay in electronics. Microphones that are farther from the ear may have better preview, at least from some directions. It can therefore be useful to have one microphone near the ear canal and one further out.

Earbud coherence can be improved by placing a feed-forward microphone such that it senses noise at or very close to the dominant noise path. The dominant noise path is frequency dependent. One noise path can be through the ear tip and adjacent body tissue near the ear canal. A feed-forward microphone close to the ear tip, which is also naturally close to the tissue near the ear canal, will be positioned to sense noise in this dominant noise path. This sensed noise can then be canceled by the ANR system, leading to greater coherence for the frequency range of interest.

In some examples this feed-forward microphone is configured to be located in the concha when the earbud is inserted into the ear, with the earbud housing overlying the feed-forward microphone. Locating a feed-forward microphone in the concha thus also allows the microphone to be less affected by the wind, potentially leading to less problematic wind noise as compared to a microphone located on an external-facing side of the earbud, where the housing does not overly the microphone and thus does not shield the microphone from wind. This can be important to both ANR and transparency mode operation.

FIG. 1A is a schematic cross-sectional view of an in-ear earbud 10; components are not shown to scale and only some components that are relevant to the present disclosure are depicted. An earbud is a non-limiting example of a wearable audio device, and can be wired or wireless. Earbud 10 includes body or housing 12 that houses the active components of the earbud. Sound outlet 14 is at the end of ear tip 16, which is carried by housing outlet portion 18. As is known in the field, ear tip 16 can be configured so that it can be inserted into the entrance of the ear canal. Audio driver 20 directs front side acoustic radiation into front acoustic cavity/chamber 22 and also directs rear side acoustic radiation into rear acoustic cavity/chamber 24. The front and rear sound is out of phase. Rear chamber 24 has one or more ports that are configured to allow sound to escape into the external environment. In this non-limiting example rear chamber 24 has one or both of first port 25 (which in an example is a resistive port comprising an acoustic mesh (not shown) over a shallow opening that is open to the external environment) and second port 26 (which in an example is a mass port comprising a long tube that is open to the external environment). Any one or more of the rear ports can have any desired length and configuration. In some examples the openings of ports 25 and 26 are both in the side 13 of housing 12 that faces the auricle when ear tip 16 is inserted into the ear canal.

The ANR system includes one or more feed-forward microphones, each of which is configured to sense external sounds, and one or more internal microphones, each of which is configured to sense internal sounds. In this non-limiting example the ANR system uses one internal microphone and two external microphones, although there could be only one, two, or more than two, external feed-forward microphones. Internal microphone 28 is configured to sense sound that will enter the user's ear canal, which can be accomplished by placing the microphone in front cavity 22 or between the cavity and earbud sound outlet 14. External feed-forward microphones 30 and 32 are on different parts of housing 12 so that they are configured to sense noise that may enter the ear through different noise paths. For example, microphone 30 is proximate sound outlet 14 and so can sense noise that enters through ear tip 16 and surrounding body tissue. Microphone 30 is also proximate port openings 25 and 26 and so is also able to sense noise that enters through these openings. Generally, the microphones are omnidirectional devices that are located just below the surface of the housing with an overlying cavity that is open to the external environment so that external sound can reach the microphone. The quantity of, placement of, and functions of, external feed-forward microphones is explained in more detail elsewhere herein.

Figure 1B:
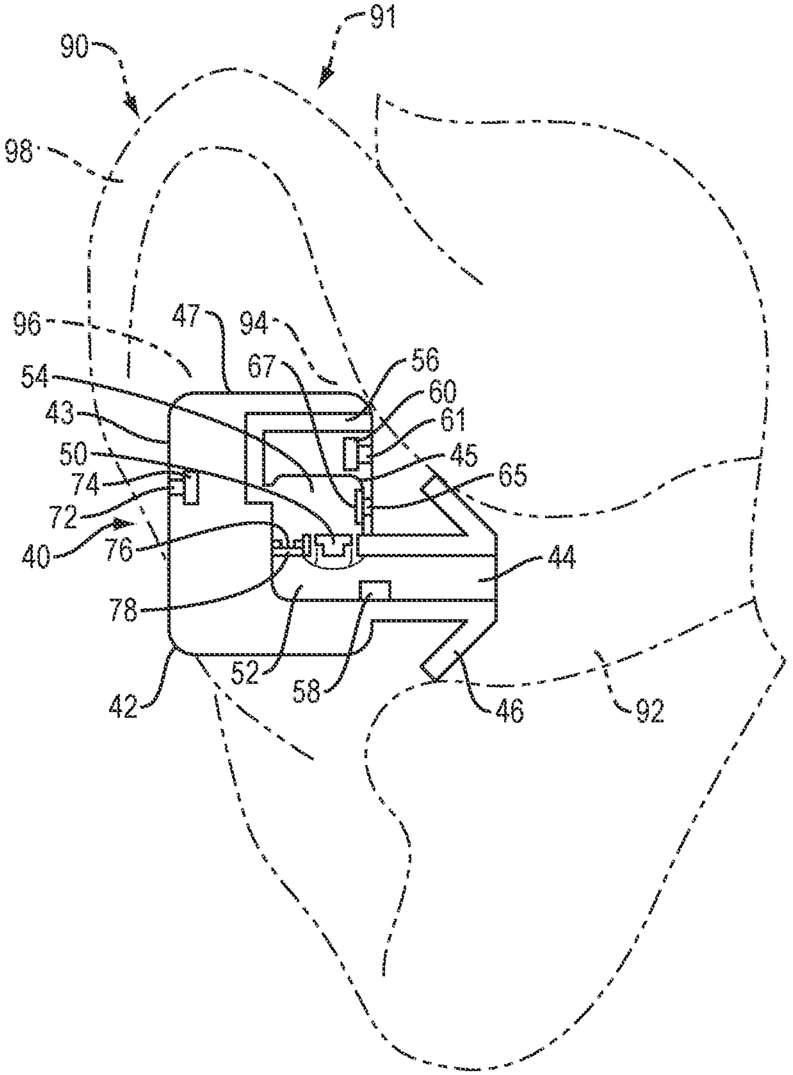
FIG. 1B is a schematic cross-sectional view of an in-ear earbud in a use position in a user's ear.

FIG. 1B is a cross-sectional view of similar earbud 40 in place in ear 90, with ear tip 46 contacting the ear at or very close to the entrance of ear canal 92. When ear tip 46 is lodged in the ear canal, earbud housing 42 is configured to be located at least partially in external ear 91, meaning that at least part of housing 42 is between the outer extent of helix 98 and the entrance to ear canal 92. In the present non-limiting example most but not all of housing 42 is configured to be located in external ear 91, including the housing's inner face 45 (that faces/is directly opposed to external ear 91 such that none of the housing is between face 45 and external ear 91), housing side face 47, and potentially some or all of housing outer face 43 that is opposed to inner face 45 and directly faces the external environment, away from the head. Feed-forward microphone 60 is located inside of housing 42. Sound inlet opening 61 in inner face 45 of housing 42 is configured to conduct external sound to be sensed by microphone 60. Second feed-forward microphone 74 is located inside of housing 42. Sound inlet opening 72 in outer face 43 of housing 42 is configured to conduct external sound to be sensed by microphone 74.

As discussed above, the coherence of an earbud ANR system is at least in part improved if there is an ANR feed-forward microphone located such that it is configured to sense noise that may reach the user's eardrum unless it is reduced or canceled by the ANR system. The ANR system is configured to inject the opposite signal, resulting in destructive interference of the noise. Dominant noise paths of an earbud are typically through acoustic ports, through the ear tip, and through the body tissue proximate the ear canal. If the one or more feed-forward microphones are configured to sense external sounds along these noise paths, the noise can be canceled, leading to greater coherence.

Earbud 40 includes audio driver 50 that creates sound pressure in both front cavity acoustic volume 52 and back cavity acoustic volume 54. An optional pressure equalization vent comprising an opening 76 between the front and back volumes and covered by an acoustic mesh 78 fluidly interconnects the front and back volumes. There can be one or more acoustic ports for back volume 54. In the present non-limiting example there is a rear resistive port that comprises an acoustic mesh 67 over shallow opening 65 in housing inner face 45 and that is open to the external environment, and there is also a rear mass port 56 that is also open at housing inner face 45 and comprises a long tube that is open to the external environment. Both the resistive port and the mass port comprise openings in the housing that are paths for external noise to reach the eardrum through the pressure equalization port. Note that the port openings could be located elsewhere in the housing. By placing feed-forward microphone 60 such that its sound inlet opening 61 is close to both the resistive port and the mass port, the signal developed by microphone 60 can sense noise that enters through the resistive port and the mass port and so can increase the coherence of the ANR. Also, since sound inlet opening 61 of microphone 60 is close to ear tip 46 and the body tissue proximate the ear canal, the signal developed by microphone 60 can sense noise that enters through ear tip 46 and the body tissue proximate the ear canal and so can increase the coherence of the ANR. In some examples a feed-forward microphone for the ANR system is located close to or proximate each sound inlet opening (e.g., ports) through which external sound can reach the eardrum. This way, noise paths to the eardrum are sensed and so can be canceled.

Sound inlet 61 is located in the concha 94 of ear 90. Although ear anatomy varies quite a bit person-to-person, generally the concha is a concavity on the median surface of the auricle of the ear, divided by a ridge (the helix crus) into an upper cymba conchae and a lower cavum conchae that leads to the external auditory meatus. By locating sound inlet 61 in concha 94, and preferably in the cavum conchae where most or all of the ear tip 46 is located, noise that enters through the ear tip is sensed and can be reduced or canceled by the ANR functionality. Also, by locating microphone 60 sound inlet 61 in the cavum conchae that is immediately adjacent to the external auditory meatus, microphone 60 will sense noise that enters the ear through tissue surrounding the ear canal and so the ANR functionality can reduce or cancel this noise.

With earbud 40, second feed-forward microphone 74 (with sound inlet opening 72 in outer housing face 43) is configured to sense noise in the environment earlier in time than microphone 60; the ANR system thus has more time to react to this noise signal before it reaches the ear, and so may be more effective to cancel the noise. Also, microphone 74 is positioned to sense the user's voice, for example for use in communications (e.g., phone calls and voice-activated devices). Internal ANR feedback microphone 58 is configured to sense sound that will enter the user's ear canal, which can be accomplished by placing the microphone in front cavity 52 or between the cavity and sound outlet 44.

Figure 2:
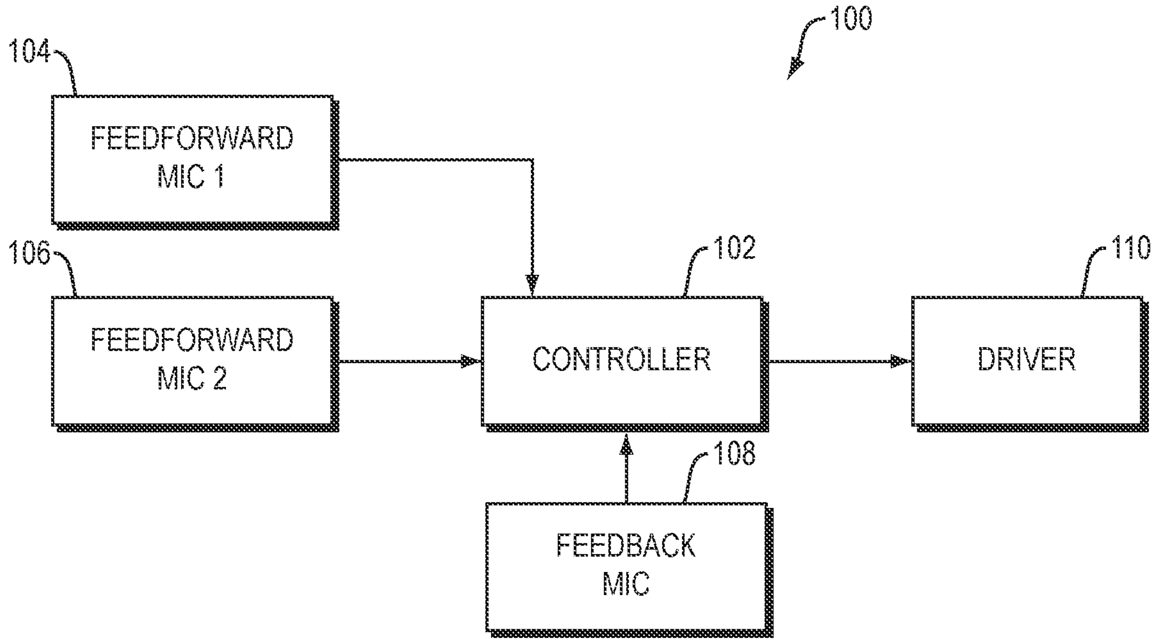
FIG. 2 is a functional block diagram of aspects of an ANR earbud with multiple feed-forward microphones.

Functional aspects 100 of an ANR earbud with multiple feed-forward microphones 100 are illustrated in FIG. 2. The signals from each feed-forward microphone (feed-forward microphone 1 (104) and feed-forward microphone 2 (106)) and the signals from the feedback microphone(s) (feedback microphone 108) are inputted to controller 102, which in some examples comprises a vector of multiple controllers. In some examples controller 102 comprises one filter associated with each feed-forward microphone. Controller 102 provides output signals for audio driver 110, the signals in part accomplishing the sound pressure that reduces noise as part of the ANR functionality. ANR audio devices with one or more external feed-forward microphones and one or more internal feedback microphones are known in the technical field, and so aspects such as the design of the one or more ANR controllers, filters applied by the controller, and customization of ANR that relate to the earpieces or earphones used in the acoustic device, are not further described herein. Such aspects are described in U.S. Pat. Nos. 10,665,220 and 10,937,410, the entire disclosures of which are incorporated by reference herein for all purposes.

Figure 3:
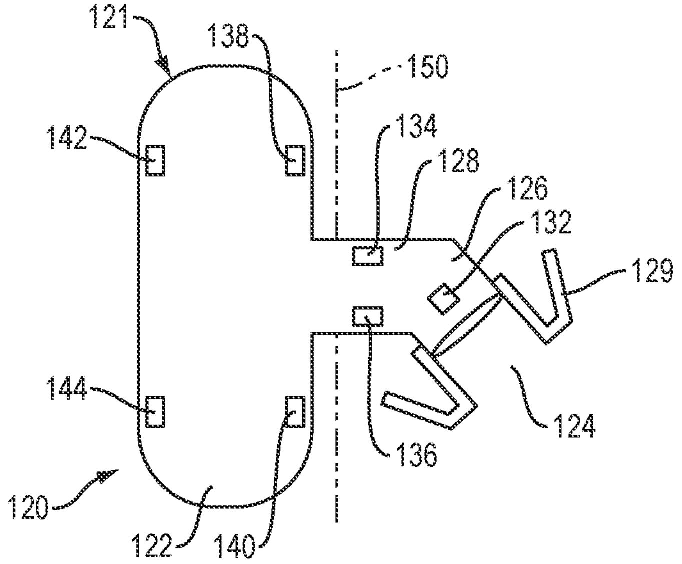
FIG. 3 is a schematic three-dimensional view of an earbud.

FIG. 3 is a schematic partially three-dimensional view of an earbud 120 wherein housing 121 comprises main portion 122, intermediate portion 128 and outlet portion 126. Ear tip 129 (which is configured to be inserted into the ear canal) is coupled to outlet portion 126 and defines earbud sound outlet 124. A number of possible external feed-forward and/or communication microphones are indicated by small squares, including location 132 that is configured to be located in the concha very close to the external auditory meatus. Dashed line 150 indicates the approximate outer boundary of the concha. Given that microphones need to be placed below the surface of the housing, and that wiring needs to be run between the microphones and at least the controller (not shown, and which is typically located in main housing portion 122), locating a microphone so close to the earbud outlet may be physically difficult. Housing intermediate portion 128 leads from main portion 122 to outlet portion 126 and is thus closer to the location of the controller but at the same time is also close to ear tip 129. Portion 128 thus may house microphone(s) (e.g., microphones 134 and 136) more easily than portion 126, yet is still close to ear tip 129 and the ear canal opening, and so is still in or very close to a noise path through the ear tip and tissue proximate the ear canal. Either or both of microphones 134 and 136 can be used as feed-forward microphones for the ANR function. In some examples one of microphones 134 and 136 will be used as a feed-forward microphone, and it may also be used as a voice pickup. In some examples main housing 122 includes one or more of microphones 138, 140, 142, and 144. In an example one of these microphones can be arrayed with one of microphones 134 and 136 for voice pickup, as is known in the technical field.

Figure 4:
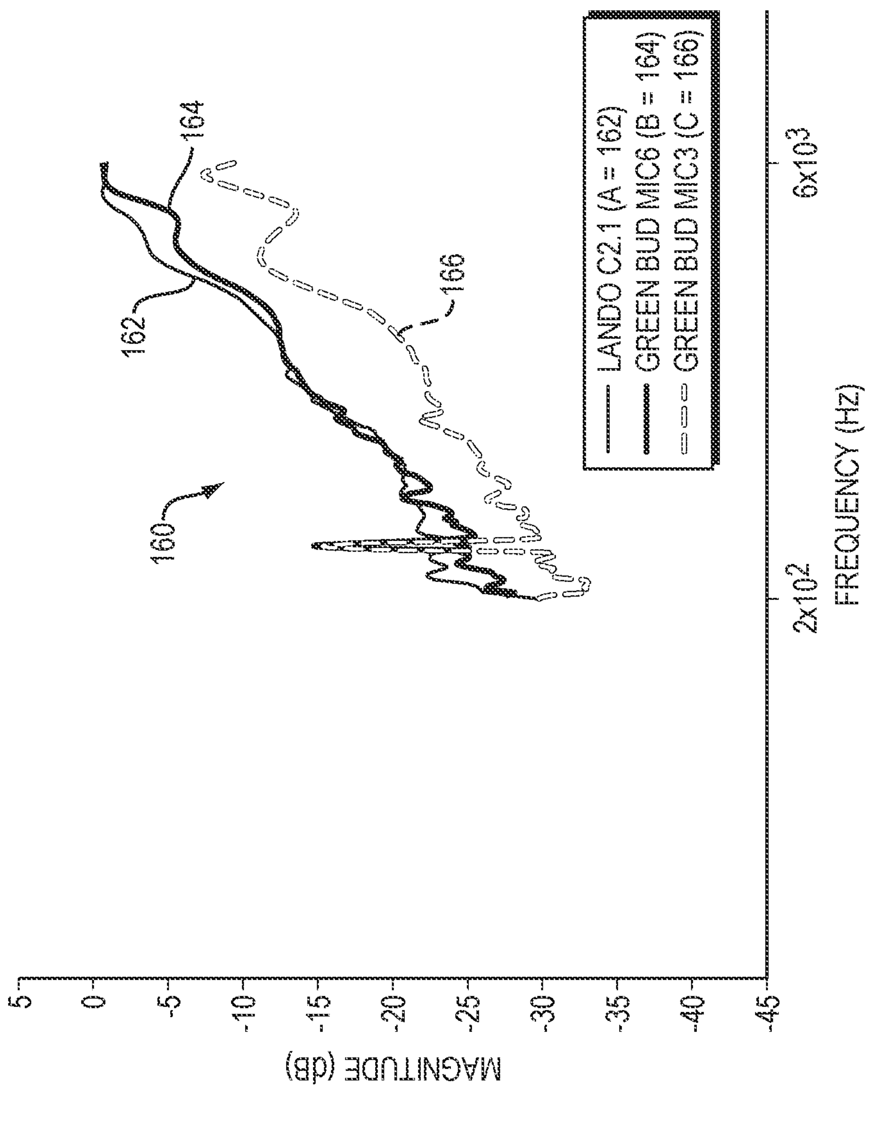
FIG. 4 is a comparison of the coherence of ANR earbud with a different microphone configuration.

FIG. 4 is a comparison of the coherence limit (plotted as insertion gains) of ANR earbud 120, FIG. 3, using a microphone on the outer part of main housing portion 122 (e.g., microphone 142 or 144) as the feed-forward microphone (plot lines 162 and 164) vs. using a microphone on intermediate housing portion 128 (e.g., microphone 134 or 136) as the feed-forward microphone (plot line 166). As is evident, starting at around 200 Hz up to around 6 kHz the coherence with microphone 134 or 136, which is located in the concha and close to the ear tip and the ear canal opening, is about 5 dB or more better than the coherence with a microphone on the main housing portion, which is not located in the concha and is farther from the ear tip and the ear canal opening. In some examples this frequency range over which coherence is improved encompasses the range where a dominant noise path is through the ear tip and surrounding body tissue.

Figure 5:
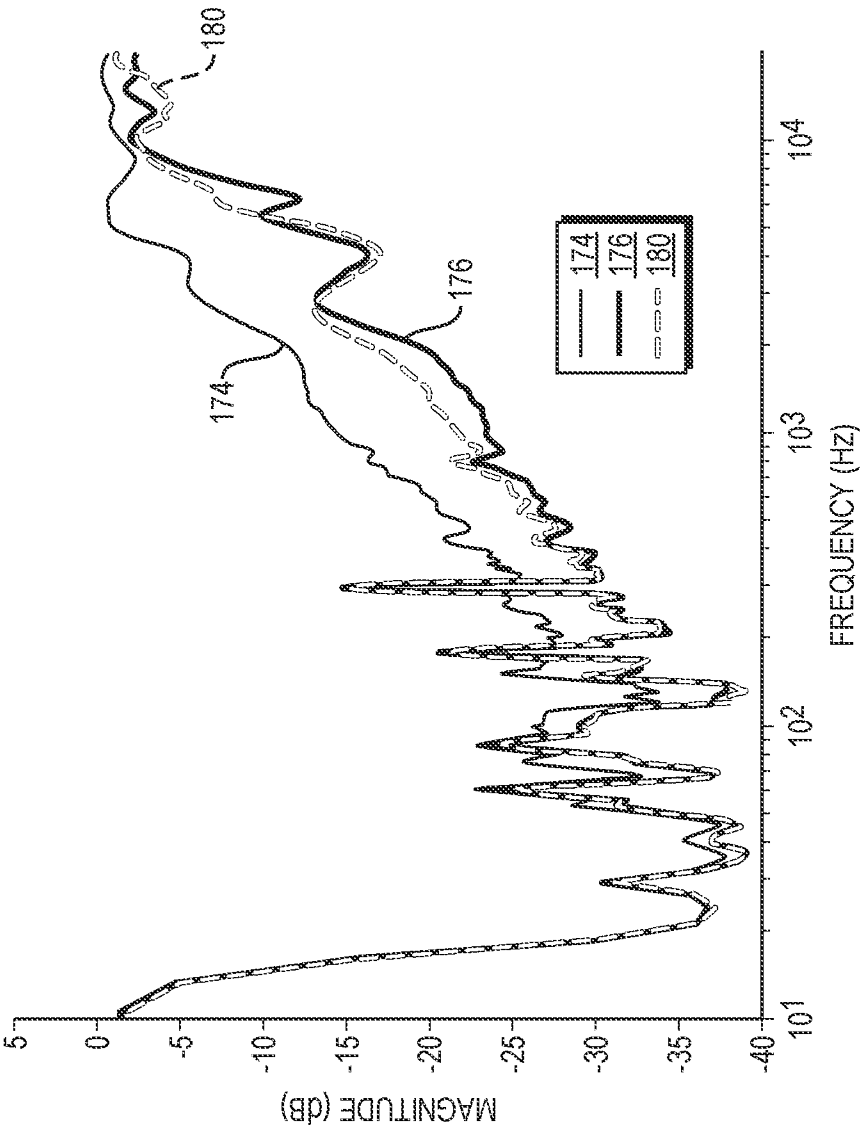
FIG. 5 is a comparison of the coherence of ANR earbud with a different microphone configuration.

FIG. 5 is a comparison of the multiple coherence limit (plotted as insertion gains) of ANR earbud 120, FIG. 3, with two separate microphones used in the ANR function rather than only one (but including a comparison to a single microphone to illustrate some advantages of using two feed-forward microphones for ANR). Plot line 174 is for a single microphone on the external side of main housing portion 122 (e.g., microphone 142 or 144) as the feed-forward microphone. Plot line 176 is for two feed-forward microphones, one on intermediate housing portion 128 (e.g., microphone 134 or 136) and the other on the external side of main housing portion 122 (e.g., microphone 142 or 144). Plot line 180 is for two feed-forward microphones, one on intermediate housing portion 128 (e.g., microphone 134 or 136) and the other on the internal side of main housing portion 122 that is closest to intermediate portion 128 (e.g., microphone 138 or 140). FIG. 5 establishes that adding a second feed-forward microphone on intermediate portion 128 helps to accomplish better coherence than using a single microphone on the main housing portion.

Figure 6:
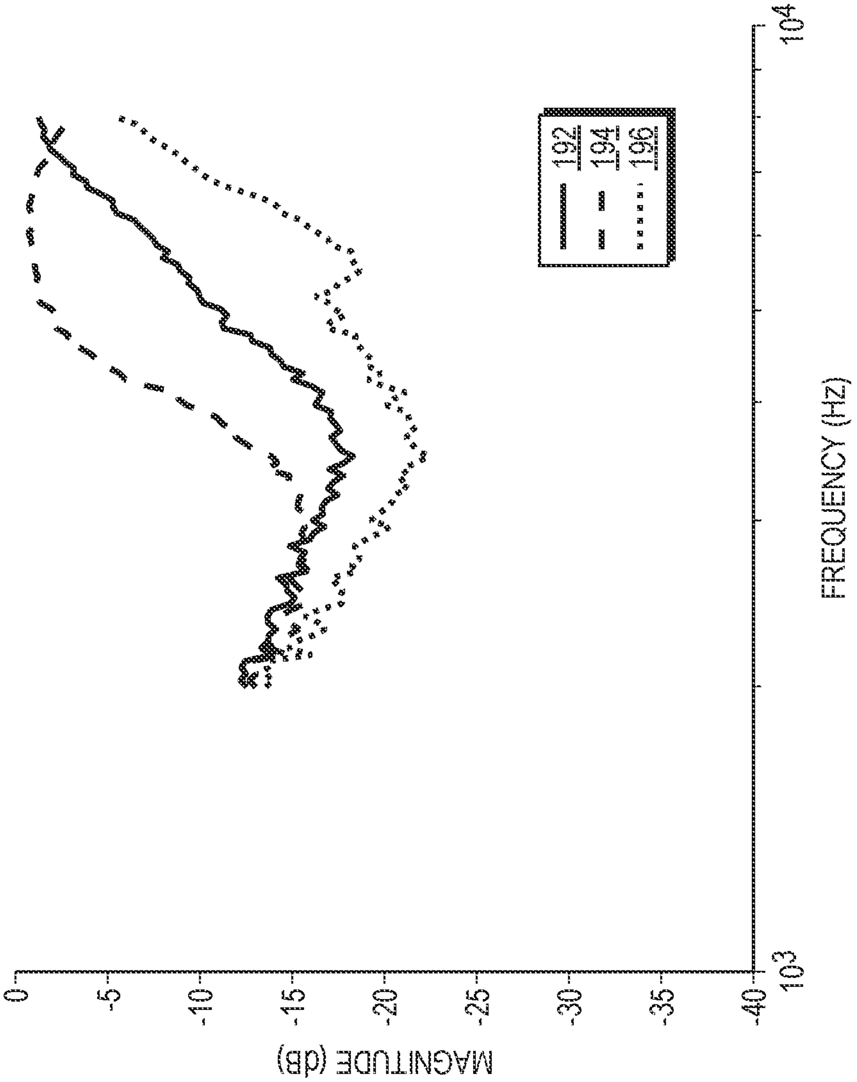
FIG. 6 is a comparison of the coherence of ANR earbud with a different microphone configuration.

FIG. 6 is a comparison of single and multiple coherence limits (plotted as insertion gains) of ANR earbud 120, FIG. 3, using either one or two separate microphones on intermediate housing portion 128 in the ANR function. Plot line 192 is for a single microphone on the intermediate housing portion 128 (e.g., one of microphone 134 or 136) as the feed-forward microphone. Plot line 194 is also for a single microphone on the intermediate housing portion 128 (e.g., the other of microphone 134 or 136) as the feed-forward microphone. Plot line 196 is for two feed-forward microphones, both on intermediate housing portion 128 (e.g., microphones 134 and 136). The use of multiple microphones can thus lead to greater reduction of diffuse noise.

Examples of the systems, methods and apparatuses discussed herein are not limited in application to the details of construction and the arrangement of components set forth in the following description or illustrated in the accompanying drawings. The systems, methods and apparatuses are capable of implementation in other examples and of being practiced or of being carried out in various ways. Examples of specific implementations are provided herein for illustrative purposes only and are not intended to be limiting. In particular, functions, components, elements, and features discussed in connection with any one or more examples are not intended to be excluded from a similar role in any other examples.

Examples disclosed herein may be combined with other examples in any manner consistent with at least one of the principles disclosed herein, and references to "an example," "some examples," "an alternate example," "various examples," "one example" or the like are not necessarily mutually exclusive and are intended to indicate that a particular feature, structure, or characteristic described may be included in at least one example. The appearances of such terms herein are not necessarily all referring to the same example.

Also, the phraseology and terminology used herein is for the purpose of description and should not be regarded as limiting. Any references to examples, components, elements, acts, or functions of the computer program products, systems and methods herein referred to in the singular may also embrace embodiments including a plurality, and any references in plural to any example, component, element, act, or function herein may also embrace examples including only a singularity. Accordingly, references in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

Some elements of figures are shown and described as discrete elements in a block diagram. These may be implemented as one or more of analog circuitry or digital circuitry. Alternatively, or additionally, they may be implemented with one or more microprocessors executing software instructions. The software instructions can include digital signal processing instructions. Operations may be performed by analog circuitry or by a microprocessor executing software that performs the equivalent of the analog operation. Signal lines may be implemented as discrete analog or digital signal lines, as a discrete digital signal line with appropriate signal processing that is able to process separate signals, and/or as elements of a wireless communication system.

When processes are represented or implied in the block diagram, the steps may be performed by one element or a plurality of elements. The steps may be performed together or at different times. The elements that perform the activities may be physically the same or proximate one another, or may be physically separate. One element may perform the actions of more than one block. Audio signals may be encoded or not, and may be transmitted in either digital or analog form. Conventional audio signal processing equipment and operations are in some cases omitted from the drawing.

Examples of the systems and methods described herein comprise computer components and computer-implemented steps that will be apparent to those skilled in the art. For example, it should be understood by one of skill in the art that the computer-implemented steps may be stored as computer-executable instructions on a computer-readable medium such as, for example, flash ROMS, nonvolatile ROM, and RAM. Furthermore, it should be understood by one of skill in the art that the computer-executable instructions may be executed on a variety of processors such as, for example, microprocessors, digital signal processors, gate arrays, etc. For ease of exposition, not every step or element of the systems and methods described above is described herein as part of a computer system, but those skilled in the art will recognize that each step or element may have a corresponding computer system or software component. Such computer system and/or software components are therefore enabled by describing their corresponding steps or elements (that is, their functionality), and are within the scope of the disclosure.

Functions, methods, and/or components of the methods and systems disclosed herein according to various aspects and examples may be implemented or carried out in a digital signal processor (DSP) and/or other circuitry, analog or digital, suitable for performing signal processing and other functions in accord with the aspects and examples disclosed herein. Additionally or alternatively, a microprocessor, a logic controller, logic circuits, field programmable gate array(s) (FPGA), application-specific integrated circuits) (ASIC), general computing processor(s), micro-controller(s), and the like, or any combination of these, may be suitable, and may include analog or digital circuit components and/or other components with respect to any particular implementation.

Functions and components disclosed herein may operate in the digital domain, the analog domain, or a combination of the two, and certain examples include analog-to-digital converters) (ADC) and/or digital-to-analog converter(s) (DAC) where appropriate, despite the lack of illustration of ADC's or DAC's in the various figures. Further, functions and components disclosed herein may operate in a time domain, a frequency domain, or a combination of the two, and certain examples include various forms of Fourier or similar analysis, synthesis, and/or transforms to accommodate processing in the various domains.

Any suitable hardware and/or software, including firmware and the like, may be configured to carry out or implement components of the aspects and examples disclosed herein, and various implementations of aspects and examples may include components and/or functionality in addition to those disclosed. Various implementations may include stored instructions for a digital signal processor and/or other circuitry to enable the circuitry, at least in part, to perform the functions described herein.

Having described above several aspects of at least one example, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. A method comprising:

receiving a first input signal developed by a first feedforward microphone associated with an active noise reduction (ANR) earbud with a housing, wherein the first feedforward microphone is configured to sense external sound that is conducted through a first sound inlet opening in the housing, and wherein the first sound inlet opening is configured to sit within a concha cavum of a user's ear and faces toward an auricle of the user's ear when the earbud is worn; and processing the first input signal using a first filter, to generate a first output signal for an acoustic transducer of the ANR earbud, wherein the ANR earbud further comprises a second feedforward microphone configured to develop a second input signal, and a second sound inlet opening in the housing and configured to conduct external sound to be sensed by the second feedforward microphone.

2. The method of claim 1, wherein the housing comprises an outlet portion that defines a sound outlet, wherein the outlet portion is configured to be located in or proximate the external auditory meatus of a user's ear.

3. The method of claim 2, wherein the outlet portion comprises a compliant ear tip that defines the sound outlet.

4. The method of claim 1, wherein the ANR earbud further comprises a first acoustic port in the housing that is in fluid communication with the external auditory meatus, wherein at least one of the first sound inlet opening and the second sound inlet opening is proximate the first acoustic port.

5. The method of claim 4, wherein the ANR earbud further comprises a second acoustic port in the housing that is in fluid communication with the external auditory meatus, wherein the first sound inlet opening is proximate the first acoustic port and the second sound inlet opening is proximate the second acoustic port.

6. The method of claim 1, wherein the ANR earbud further comprises:

a third feedforward microphone disposed in the housing; and a third sound inlet opening extending through the housing and configured to conduct external sound to the third feedforward microphone, wherein the third sound inlet opening is configured to sit outside of the concha cavum of the user's ear and face away from the auricle of the user's ear when the earbud is worn.

7. The method of claim 6, wherein one or both of the second and third feedforward microphones is arrayed with the first microphone for voice pickup.

8. The method of claim 1, wherein a coherence of the ANR earbud in a frequency range, and determined from only the first input signal, is greater than the coherence in the frequency range determined from only the second input signal.

9. The method of claim 8, wherein the frequency range is above 3 kHz.

10. The method of claim 1, wherein the first sound inlet opening is adjacent to the ear tip.

11. The method of claim 10, wherein when the ear tip is located in or proximate the external auditory meatus of the user's ear the first sound inlet opening is in the concha of the user's ear.

12. The method of claim 1, wherein the ANR earbud further comprises:

an audio driver disposed within the housing; and a first port, wherein a first side of the audio driver directs acoustic radiation into a front acoustic cavity within the housing, wherein a second side of the audio driver directs acoustic radiation into a rear acoustic cavity within the housing, and wherein the first port is configured to allow sound to exit the rear acoustic cavity into an external environment.

13. The method of claim 12, wherein the first port is configured to sit within the concha cavum of the user's ear and face toward the auricle of the user's ear when the earbud is worn.

14. The method of claim 12, wherein the first sound inlet opening is proximate the first port such that the first feedforward microphone is able to sense sound exiting the rear acoustic cavity through the first port.

15. The method of claim 12, wherein the first port comprises a resistive port comprises an acoustic mesh over a shallow opening.

16. The method of claim 12, wherein the first port comprises a mass port comprising a long tube that is open to the external environment.

17. The method of claim 12, wherein the ANR earbud further comprises a second port that allows sound to exit the rear acoustic cavity into the external environment.

18. The method of claim 17, wherein the first port is one of a resistive port or a mass port, and the second port is the other of the resistive port or the mass port.

* * * * *